Dec. 1, 1964 C. H. AUGER 3,159,379
ROTOR CONSTRUCTION
Filed July 17, 1961
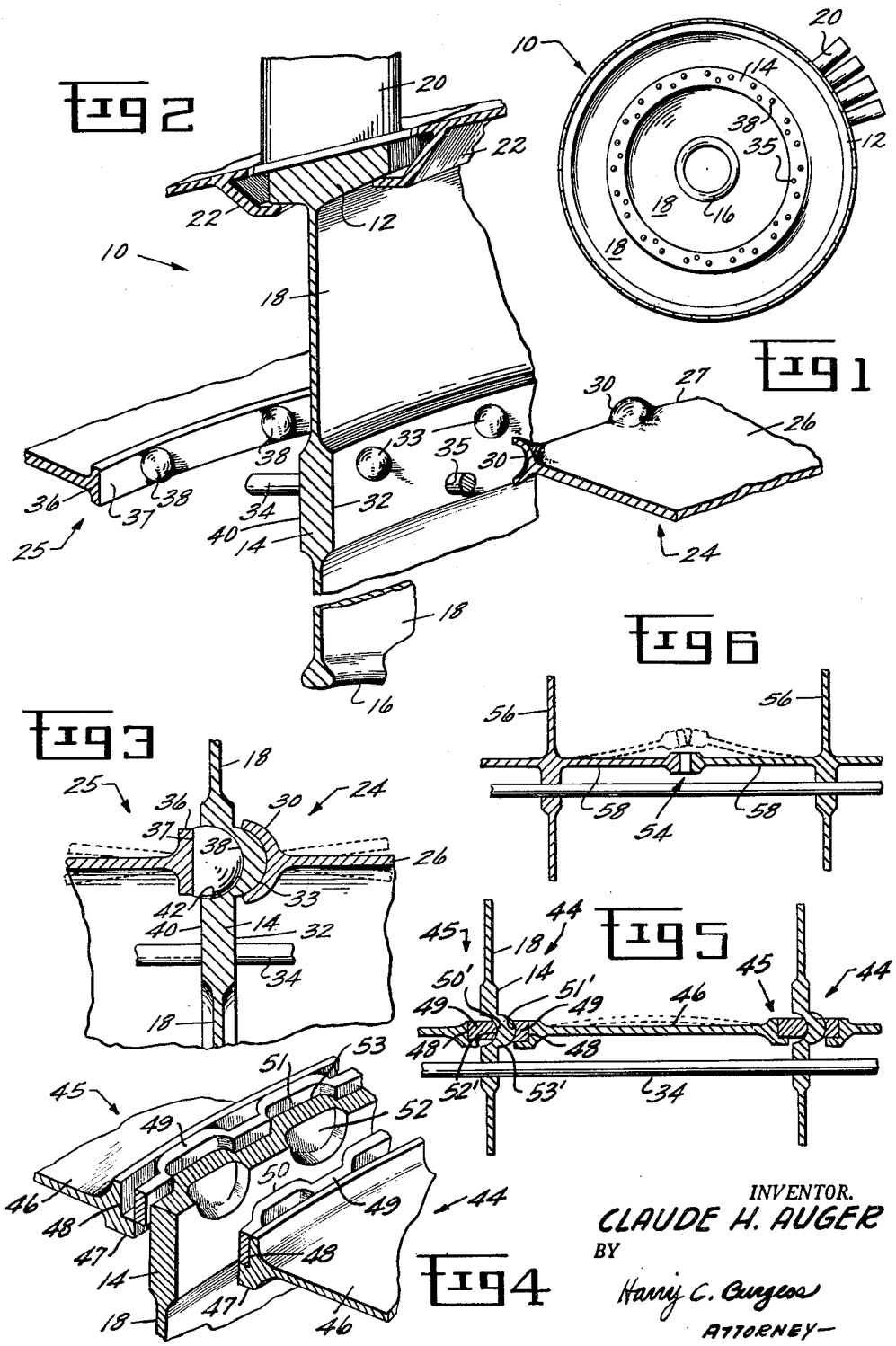
INVENTOR.
CLAUDE H. AUGER
BY
Harry C. Burgess
ATTORNEY United States Patent Office 3,159,379
Patented Dec. 1, 1964

3,159,379
ROTOR CONSTRUCTION
Claude H. Auger, Cincinnati, Ohio, assignor to General
Electric Company, a corporation of New York
Filed July 17, 1961, Ser. No. 124,495
1 Claim. (Cl. 253—39)

The present invention relates generally to a rotor construction, and, more particularly, to improved means for intercoupling a plurality of blade-carrying disk members in a multistage, axial-flow turbine or compressor rotor, or the like, and a method for making same.

It is desirable in multistage rotating machinery, such as a gas turbine or the like, to have stable transmission of developed torque between each independent rotor stage to achieve overall smoothness of operation. A design problem in this area concerns the manner whereby the individual blade-supporting disk members of such a machine are coupled one to another so as to assure that there will be no relative motion between the individual members about their common axes. This is necessary for the reason that usually in multistage turbomachines the absence of relative motion between the individual stages or disk members is of critical importance where smooth operation is desired. For example, where the developed torque being transmitted is substantial, relative motion between stages could result in the destruction of one or more components of the multistage turbomachine rotor. Moreover, it is especially necessary in the case of extremely lightweight, thin-walled rotor components that these components have sufficient strength, both in shear and bending, to enable them to withstand the stresses imposed by the high speed operation typical of today's advanced turbomachinery, such as, for example, turbojet engines for aircraft.

Recent jet engine designs have sometimes made use of the type of interstage coupling known as a "gear-type" coupling. This coupling may be described generally as being of the face-tooth, spline or clutch variety in which pluralities of teeth on opposing members interengage to connect the members. While such couplings have proven to be fairly successful in eliminating vibration and are able to withstand shear and bending stresses, manufacture of the coupling teeth or splines has usually required expensive and costly special machine tools and processes. Furthermore, with use of these, and other prior art couplings, where extremely lightweight and thin-walled members are used there is a chance of some misalignment and additional stress under the influence of centrifugal force when the coupling members expand during operation of the rotor.

Therefore, it is the general object of the present invention to provide a rotor construction having an improved interstage coupling means and a method of making same.

A more specific object of this invention is to provide a rotor construction for a turbomachine including an improved interstage coupling means which can be simply and economically manufactured and which maintains good contact under the influence of centrifugal forces during operation of the machine.

Briefly, in accordance with a disclosed embodiment of my invention, I provide a turbomachine rotor construction and method of making coupling means therefor wherein the rotor has a plurality of juxtaposed, blade-carrying wheel disk members each disk member including a circular rib portion, the rib portion having a plurality of coupling means consisting of "twin" generally spherical indentations and projections. The disk members are coupled together by a plurality of torque transmitting coupling members, each of such members being located between pairs of adjacent disk members, each coupling member having on opposite end faces thereof further coupling means adapted to mate with the "twin" disk member rib projections and indentations, respectively. Means are also provided to maintain the disk members and coupling members in engagement when in an assembled relationship.

While the specification includes claims particularly pointing out and distinctly claiming the subject matter of my invention, the organization and operation of the invention together with further objects and advantages thereof may best be understood by reference to the following description taken in connection with the accompanying drawings in which:

FIGURE 1 is an end view along the axis of one of a plurality of wheel disk members in a turbomachine rotor utilizing the present invention;

FIGURE 2 is an enlarged fragmentary perspective view, partially in section, of the rotor wheel disk member of FIGURE 1, including fragmentary views, also partially in section, of a pair of coupling members for engagement therewith, the coupling members and the disk utilizing my improved spherical coupling means;

FIGURE 3 is an enlarged fragmentary perspective view, partially in section, along the radius of the assembled turbomachine rotor and showing a disk and coupling member in interengagement;

FIGURE 4 is a fragmentary perspective view, partially in section, of a further embodiment of my invention;

FIGURE 5 is a fragmentary side view, partially in section, of a further embodiment of my improved rotor construction; and FIGURE 6 is a fragmentary view illustrating one of the difficulties inherent in certain of the prior art couplings which my invention is designed to overcome.

Referring now more particularly to the drawings, a rotor disk similar to those used in a typical turbomachine rotor is indicated generally by numeral 10 in FIGURE 1. The disk includes an enlarged rim portion 12, a circular rib portion 14, and a central aperture 16, all joined by an intermediate web portion 18. The rim portion supports a plurality of rotor blades 20 in any suitable manner of which many are well known in the art. Positioned between the rim portions of adjacent disks, as shown more clearly in FIGURE 2, are means 22 which, together with the blades provide a flow-path through the machine. Means 22, sometimes called "spacers," may be of the "floating" or collapsible type.

FIGURE 2 discloses one embodiment of my improved means for interconnecting the rotor disks and transmitting torque throughout the multistage rotor assembly. Shown in the drawing are a pair of coupling members indicated generally at 24 and 25. Coupling member 24 has a cylindrically-shaped main body portion 26 and a pair of end faces, one of which is shown at 27. Located on the end face 27 of the coupling member 24 are a plurality of generally hemispherical or cup-shaped coupling means 30.

Referring now to the circular rib portion 14 of the disk member 10, rib face 32 on one side of the disk includes a plurality of projections 33. It will be seen that these projections are also generally hemispherical, or ball-shaped, and thus are adapted to be received in the hemispherical "cups" 30. Due to the nature of the preferred method of forming the projections 33 on the wheel disk rib portion, coupling member 25 is constructed to provide a coupling means which is the equivalent of the rib projections 33. To explain, as will be seen from the drawings, coupling member 25 includes an enlarged end flange 36 having a radial face 37. Spaced about the face 37 in a circular path are a plurality of generally hemispherical, or ball-shaped coupling means 38. By referring specifically to FIGURE 3, it will be seen that the opposite face 40 of the disk rib 14 includes a plurality of generally hemispherical indentations or "cups" 42. It will be realized that the inside diameter of each cup 42 is of the same dimension as the outside diameter of the ball-shaped coupling 33 on the rib face 32. In other words, the preferred method of forming the "twin" indentations or cups and hemispherical projections in the rib is to use a die punch similar in shape to the coupling 25, as seen in cross-section in FIGURE 3, whereby at spaced intervals along the rib an indentation and a projection are formed simultaneously. In the preferred method, the disk material at the rib area is laterally confined by the die to permit axial flow of the metal displaced by the punch, as the latter compresses the rib material at the one face 40, while allowing it to flow axially at the other face 32 to form the "twin" indentations or cups 42 and projections or ball-shaped couplings 33, respectively. Thus, it will be seen from FIGURE 3 that in an assembled rotor, according to my invention, torque is transmitted between adjacent rotor disk members 10, by hemispherical ball-shaped coupling means 33 and 38 engaged with like hemispherical cup-shaped coupling means 30 and 42, respectively.

The coupling means just described are preferably equally spaced along a predetermined circumferential path for best transmission of torque depending on the rotor application. A plurality of axially-extending tie-rods, or the like, one of which is shown at 34, received in holes 35 may be utilized to maintain the rotor disk and coupling members in an assembled relationship.

Another embodiment of the invention is shown in FIGURE 4. In this embodiment, interstage coupling members, indicated generally at 44 and 45, are provided. Each member includes a cylindrical body portion 46 and enlarged end flanges 47—47. The end flanges on each coupling member are notched or cut away to form a platform 48. Adapted to be received on, and affixed to, each platform is a coupling ring 49. Each coupling ring is in the form of a band, die punched at preselected intervals, as described above, to form "twin" coupling means 50 and 51. The coupling means 50 and 51 are likewise adapted to project into, and receive, coupling means 52 and 53, respectively, on the disk rib 14. In this embodiment the "bottoms" of the "cups" 51 and 52, and thus, the "tops" of the "balls" 50 and 53 are flattened to enable the coupling rings 49 to be more firmly secured to the platforms 48 of the end flanges 47 of each coupling member. The "twin" coupling means of the disk are shown as being flat also since, again, using the preferred method of forming, described hereinabove, a single die punch is used for both disks and coupling members.

This embodiment, slightly modified, is also shown in FIGURE 5. The coupling member and rotor disk "twin" projections 50' and 53', and indentations 51' and 52' are here shown as having the hemispherical shape of the embodiment of FIGURE 3. However, the flat embodiment of FIGURE 4 is equally utilized. It will be seen from this arrangement that the main body portions of these coupling members are relatively simple cylindrical pieces adapted to receive the coupling rings 49, which are press- fitted, welded, brazed, or otherwise rigidly affixed in the grooves 48. The just described arrangements have the advantage, among other things, of enabling replacement of worn or damaged coupling means without the necessity of doing away with the entire coupling member. Another advantage of this construction is that the "ball" and "cup" coupling means on coupling rings 49 can be made with the same tooling used to make the "ball" and "cup" coupling means on the disks 10.

One of the primary advantages of my improved coupling means can, perhaps, be better realized by referring to FIGURE 6. Indicated therein is a typical prior art rotor construction utilizing well-known conventional face-tooth coupling means, indicated generally at 54. In this arrangement the rotor disks 56 are interconnected, for torque-transmission therebetween, by means of the couplings which are typically located on the ends of flanges or extensions 58, although separate coupling members may be employed. As can be seen in the drawing (dotted lines), under the urging of centrifugal force there is a tendency for the coupling extensions, or couplings themselves, to bow outward of the rotor. Where the teeth are of the usual clutch, gear, face-tooth, or spline variety, there is some amount of separation at the surfaces where the teeth are meshed. If this condition is allowed to become excessive, good surface contact is lost and undesirable misalignment may occur. The result can be unstable or unsmooth operation of the turbomachine. It will be clear from the configuration of my improved coupling means, as described above, that bending or bowing of the coupling will be taken up, or compensated for, by rotation by the ball-type coupling means. In other words, as seen in FIGURE 3 (dotted lines), when the web or body portions of the coupling member tend to bow out, the only result will be rotation of the coupling means 30 and 38 on the "ball" or projection 33, and in the "cup" or indentation 42, respectively. Since most of the stress is concentrated on the portion of the coupling inwardly of the coupling member centerline, it is possible to utilize less than the complete hemisphere, as is shown in FIGURE 5, i.e., the usual hemispherical coupling can be reduced in radial dimension.

It will be apparent that I have provided a coupling arrangement which is both economical and easy to manufacture and which provides a means of preventing centrifugally induced stresses from causing undue separation of the coupling member elements. By reason of the die-punch forming of the projections and indentations, the coupling may be constructed utilizing a minimum amount of material, which will help eliminate some of the material waste usually accompanying the typical machining operations of single purpose machines designed to manufacture certain of the known face-tooth and spline type couplings.

Having thus described as the invention what is claimed is:

In a multistage rotary machine having a plurality of juxtaposed, thin-walled, lightweight blade-carrying disk members, each of said members including a rim portion, a central aperture, an enlarged rib portion having radially-extending faces on opposite sides thereof, coupling means between said disk members comprising a plurality of generally hemispherical projections on one of said radially-extending faces, a corresponding plurality of generally hemispherical indentations in the other of said radially-extending rib faces, each projection being axially-aligned with a corresponding indentation wherein the material displaced to form the indentation in said other face of the rib simultaneously forms the projection on said one of said rib faces, a plurality of generally cylindrical, thin-walled coupling members, each having a pair of oppositely directed end faces, one of said end faces having means supporting a first ring including a plurality of indentations which receive said disk member projections, the other of said end faces having like means supporting a second ring having a plurality of projections which are received in said disk member indentations so that when in interengagement said coupling means transmit torque between said disk members and said coupling members, said projections and said indentations being movable relative to each other during operation of said machine to compensate for the effect of centrifugal force on said thin-walled coupling members which tends to cause undesirable misalignment between the coupling members and the disk members, and means for maintaining said disk and coupling member projections and indentations in interengagement including at least one tie-bolt extending through the disk members.

References Cited in the file of this patent

UNITED STATES PATENTS

| | | |
|---|---|---|
| 2,213,940 | Jendrassik | Sept. 3, 1940 |
| 2,309,878 | Wiberg | Feb. 2, 1943 |
| 2,427,614 | Meier | Sept. 16, 1947 |
| 2,458,148 | Cronstedt | Jan. 4, 1949 |
| 2,458,149 | Cronstedt | Jan. 4, 1949 |
| 2,461,242 | Soderberg | Feb. 8, 1949 |
| 2,532,721 | Kalitinsky | Dec. 5, 1950 |
| 2,801,070 | Purvis | July 30, 1957 |
| 2,903,130 | Reichl | Sept. 8, 1959 |
| 2,942,728 | Hilton | Jan. 28, 1960 |

FOREIGN PATENTS

| | | |
|---|---|---|
| 492,252 | Germany | July 22, 1928 |